(12) United States Patent
Weissbrem et al.

(10) Patent No.: US 12,265,506 B1
(45) Date of Patent: Apr. 1, 2025

(54) ASYNCHRONOUS TO SYNCHRONOUS REPLICATION TRANSITION

(71) Applicant: VAST DATA LTD., Tel Aviv (IL)

(72) Inventors: Uri Weissbrem, Tel Aviv (IL); Avi Goren, Tel Aviv (IL); Ohad Ben-Yehuda, Tel Aviv (IL)

(73) Assignee: VAST DATA LTD., Rehovot (IL)

( * ) Notice: Subject to any disclaimer, the term of this patent is extended or adjusted under 35 U.S.C. 154(b) by 0 days.

(21) Appl. No.: 18/583,805

(22) Filed: Feb. 21, 2024

(51) Int. Cl.
G06F 16/17 (2019.01)
G06F 16/178 (2019.01)
G06F 16/18 (2019.01)

(52) U.S. Cl.
CPC ........ G06F 16/178 (2019.01); G06F 16/1873 (2019.01)

(58) Field of Classification Search
CPC .......................... G06F 16/178; G06F 16/1873
See application file for complete search history.

(56) References Cited

U.S. PATENT DOCUMENTS

| | | | |
|---|---|---|---|
| 2005/0071379 A1* | 3/2005 | Kekre | G06F 3/0605 |
| 2009/0271412 A1* | 10/2009 | Lacapra | G06F 16/178 |
| 2009/0313311 A1* | 12/2009 | Hoffmann | G06F 11/2097 |
| 2010/0191884 A1* | 7/2010 | Holenstein | G06F 16/2343 |
| | | | 707/613 |
| 2017/0177658 A1* | 6/2017 | Lee | G06F 11/1451 |
| 2018/0322157 A1* | 11/2018 | Lee | G06F 16/2471 |
| 2022/0147490 A1* | 5/2022 | Shivani | G06F 16/1844 |
| 2023/0393927 A1* | 12/2023 | Karr | H04L 67/1095 |
| 2024/0143554 A1* | 5/2024 | Kaushik | G06F 3/0611 |

* cited by examiner

Primary Examiner — Merilyn P Nguyen
(74) Attorney, Agent, or Firm — Reches Patents

(57) ABSTRACT

A method for transitioning from asynchronous replication to a synchronous replication, the method includes (i) receiving, by a DSS and following the start of the transitioning, a synchronous update related to a first FSE part; (ii) implementing the synchronous update of the first FSE part; (iii) receiving, by the DSS and following the start of the transitioning, an asynchronous update related to a last version of a second FSE part before the start of the transitioning; (iv) ignoring the asynchronous update when the DSS currently stores a version of the second FSE part that is associated with a timestamp that is indicative of a point in time that exceeds the start of the transitioning; and (v) else—implementing the asynchronous update.

19 Claims, 3 Drawing Sheets

ASYNCHRONOUS TO SYNCHRONOUS REPLICATION TRANSITION

BACKGROUND

Synchronous replication is a process that writes data to the source storage system and the destination (replica) storage system almost simultaneously. Therefore, the source copy and the replica always remain synchronized. Acknowledgement is provided back to a client that sent the incoming write request only after the data is safely written to both the source and the destination storage systems.

In asynchronous replication, a bulk of changed data is sent periodically to the destination storage system, rather than being sent upon each change. Asynchronous replication utilizes snapshots for synchronizing a point in time between the source storage system and the destination storage system. Upon each replication cycle, a snapshot is taken at the source storage system to capture a current point-in-time image of the storage to be synchronized during the cycle, and the data that was changed since the previous replication cycle is sent to the destination storage system.

There may be a need to change the replication mode from an asynchronous mode to a synchronous mode. In such cases the asynchronous replication needs to continue replicating the bulk of changes that were not yet sent to the other side, before the synchronous replication starts. However, while the asynchronous replication proceeds, more and more changes are being applied on the source storage and are piled up on the bulk of changes needed to be replicated. There is a need to catch up the gap between the current replication point in time and the current (real) time, as fast as possible, and to start the synchronous replication as soon as possible.

BRIEF DESCRIPTION OF THE DRAWINGS

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
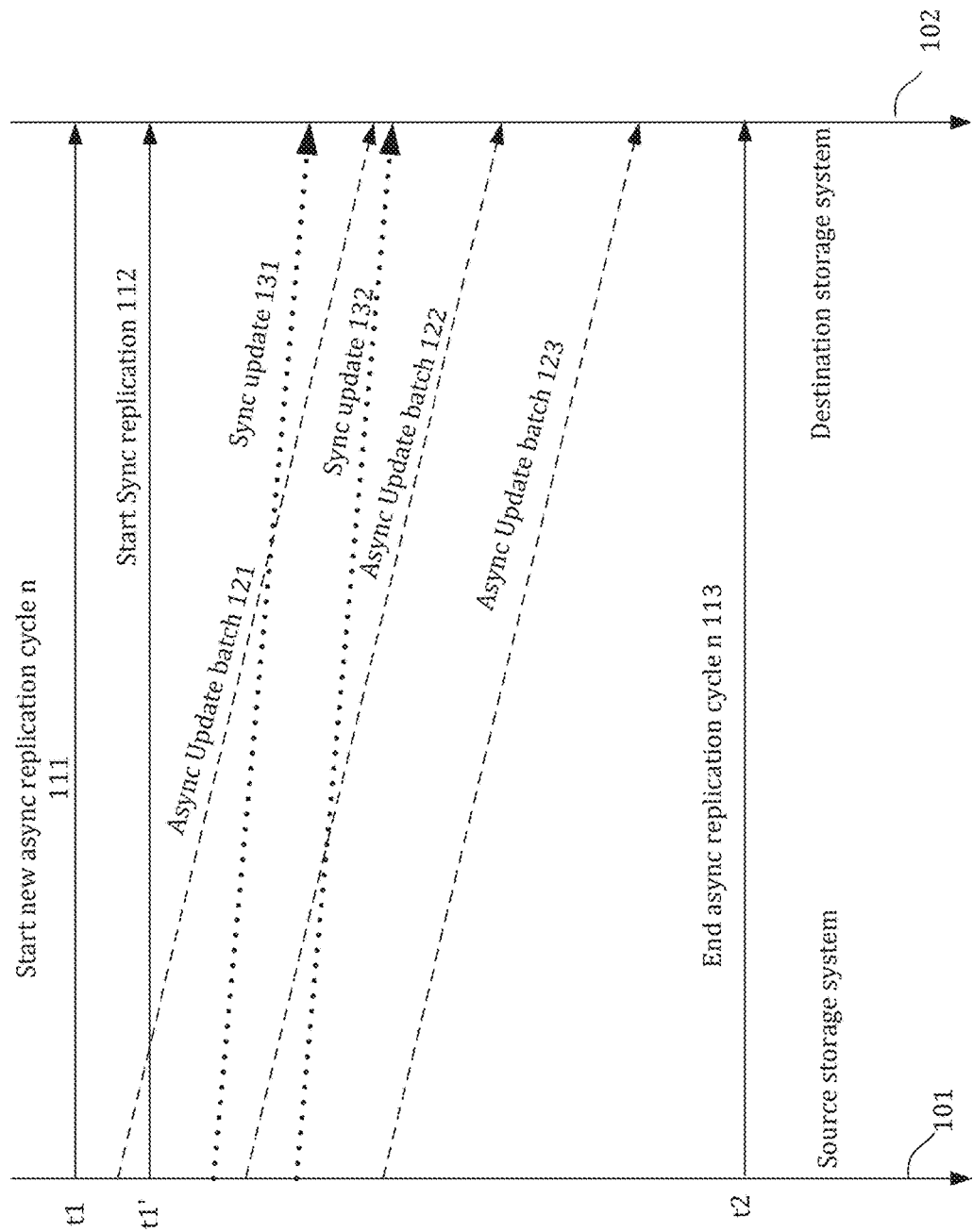
FIG. 1 is an example of a timing diagram.

A source storage system, which acts as a source of an ongoing asynchronous replication, may decide to change the replication mode, or may obtain a request to switch the replication mode to a synchronous mode.

According to an embodiment, the storage system does not need to wait for completing the transmission of content that is waiting to be transmitted as part of the asynchronous replication. Instead, at any time during an asynchronous replication cycle or between cycles, the source storage system and the destination storage system can start a synchronous replication in parallel to the present asynchronous replication cycle that is being executed, wherein current updates being performed on the source storage after switching to synchronous mode—are sent as part of synchronous replication (i.e., sent immediately), while previous updates that occurred prior to switching to synchronous mode, and were not yet replicated—are sent as part of asynchronous replication cycles and concurrently with the synchronous replication.

Executing the asynchronous replication continues until all the content that was updated at the source storage system before switching to synchronous mode is transmitted to the destination storage system.

After the completion of the asynchronous replication of content that was updated at the source storage before the replication mode switching, all the updates are replicated in a synchronous mode.

The synchronous replication transfers current updates, i.e., updates being requested by the users of the source storage system and need to be stored within both the source and the destination storage systems, prior to acknowledging the safe storage to the client.

The asynchronous replication transfers previous updates. i.e., updates that were stored in the source storage system and acknowledged to the user after being stored in the source storage system only.

Any update that was done on the source storage since a previous asynchronous replication cycle and before the start of the present replication cycle is transferred to the destination source system during the present asynchronous replication cycle. The time borders of updates being transferred as part of the present replication cycle may be determined by a previous snapshot that was taken when the previous replication cycle started and a present snapshot that was taken when the present replication cycle started.

Therefore, it can be determined that any update that is received at the destination storage system, that is part of the synchronous replication, is more recent than any update that is received at the destination storage system that is part of the asynchronous replication, regardless of the order of arrival at the destination storage system. This is guaranteed because any update, that belongs to the present asynchronous replication cycle, occurred at the source storage system before the announcement of the start of the present replication cycle (e.g., before the present snapshot that was taken upon starting the present asynchronous replication cycle).

FIG. 1 illustrates the timelines 101 and 102 at the source storage system and the destination storage system respectively, and the updates and messages transmitted by the source storage system and received at the destination storage system. The timelines show the events that occur after the determination to switch to a synchronous mode.

Before starting to send updates using the synchronous mode, a snapshot is taken to mark the time until which all the updates that are performed on the source storage are transmitted using asynchronous replication cycles. At time t1, after taking the snapshot, a message 111 announcing the start of a new (present) asynchronous replication cycle n (preceded by cycles n−1, n−2, etc.) is sent from the source storage system to the destination storage system. Once the destination storage system acknowledges reception of message 111, message 111 is followed by multiple update batches 121, 122 and 123, illustrates as dashed arrows, sent at different times. The lines are illustrated as diagonal to represent the delay between the time of sending and the reception, due to network constraints, queue loads, etc.

At time t1', immediately after taking the snapshot at t1, the source storage system sends message 112 announcing the start of a synchronous replication. Synchronous updates messages, such as sync update 131 and 132 (illustrated as dotted arrows), may be received in a mixed order with asynchronous update batches. For example, async update batch 121 was transmitted before sync update 131, but received after sync update 131, at the destination storage system.

Similarly, async update batch 122 was transmitted before sync update 132, but received after sync update 132, at the destination storage system. This may happen because synchronous updates include one update each, while an asynchronous update batch may include multitude updates, and therefore an asynchronous update has a much larger size than a synchronous update.

Furthermore, synchronous messages may be prioritized over asynchronous messages, due to the fact that the user that initiated the synchronous update is waiting for acknowledgement, and prioritizing synchronous transmission will reduce the latency experienced by the user. The mixed order at the destination may occur also due to the nature of the network transmission, where the order cannot be guaranteed.

Each update message is identified as being either a synchronous update or an asynchronous update, therefore the destination storage system can distinguish between the two types.

At t2, the source storage system sends a message 113 about the completion of async replication cycle n. From this point, only synchronous update messages are communicated.

Both the synchronous updates and the asynchronous updates target filesystem entities (FSEs), such as files, directories, or even database tables. The updates may target a portion of the FSE. Examples of FSE portions being updated, may include offsets (logical address ranges) within files, certain attributes of files, content of directories, e.g., deleting a file from a directory, adding a file to a directory, moving a file from one directory to another, etc.

Once the destination storage system has received message 112 about the starting of the synchronous replication, and while there is a non-completed asynchronous replication cycle (e.g., between time t1' and t2), the destination storage system examines the updates as follows. Each synchronous update is implemented on the stored FSE or a portion thereof, without checking any timing of the last update of the stored content. For an asynchronous update—the targeted FSE portion (e.g., a file offset) is checked for the last time that it was updated. If the stored update occurred after time t1' when the synchronous replication started, then it can be determined that the update was done by a synchronous update, and therefore is more recent than the received asynchronous update. Any synchronous update is more recent than any asynchronous update, since the asynchronous update occurred at the source storage system before t1, when the present asynchronous replication cycle started, which in turn happened before t1', when the synchronous replication started. Therefore, in this case the asynchronous update is ignored, i.e., discarded without updating the targeted FSE portion. Note, that this approach is applicable also for asynchronous updates that were sent after a sending of a synchronous update, for example, in a case where an asynchronous update included in async update batch 122 refers to a certain portion of a certain FSE, that is also targeted by sync update 131, that was sent before update batch 122. This is true because any asynchronous update is related to an update that occurred at the source storage system before the start of the asynchronous replication cycle, that preceded the start of the synchronous replication.

If the FSE portion, which is targeted by the asynchronous update, was updated before time t1 when the present asynchronous replication started, then it can be determined that the update was done by a previous asynchronous replication cycle and therefore can be overwritten with the asynchronous update.

It is noted that the asynchronous replication cycle sends only the most recent update (that preceded the start cycle's snapshot) that was applied on the FSE portion, and does not send content that was overwritten by newest content, for the same portion. Therefore, when an asynchronous update addresses a certain FSE portion—it can be assumed that this is the first and only update that is performed on the FSE portion during the present cycle.

Figure 2:
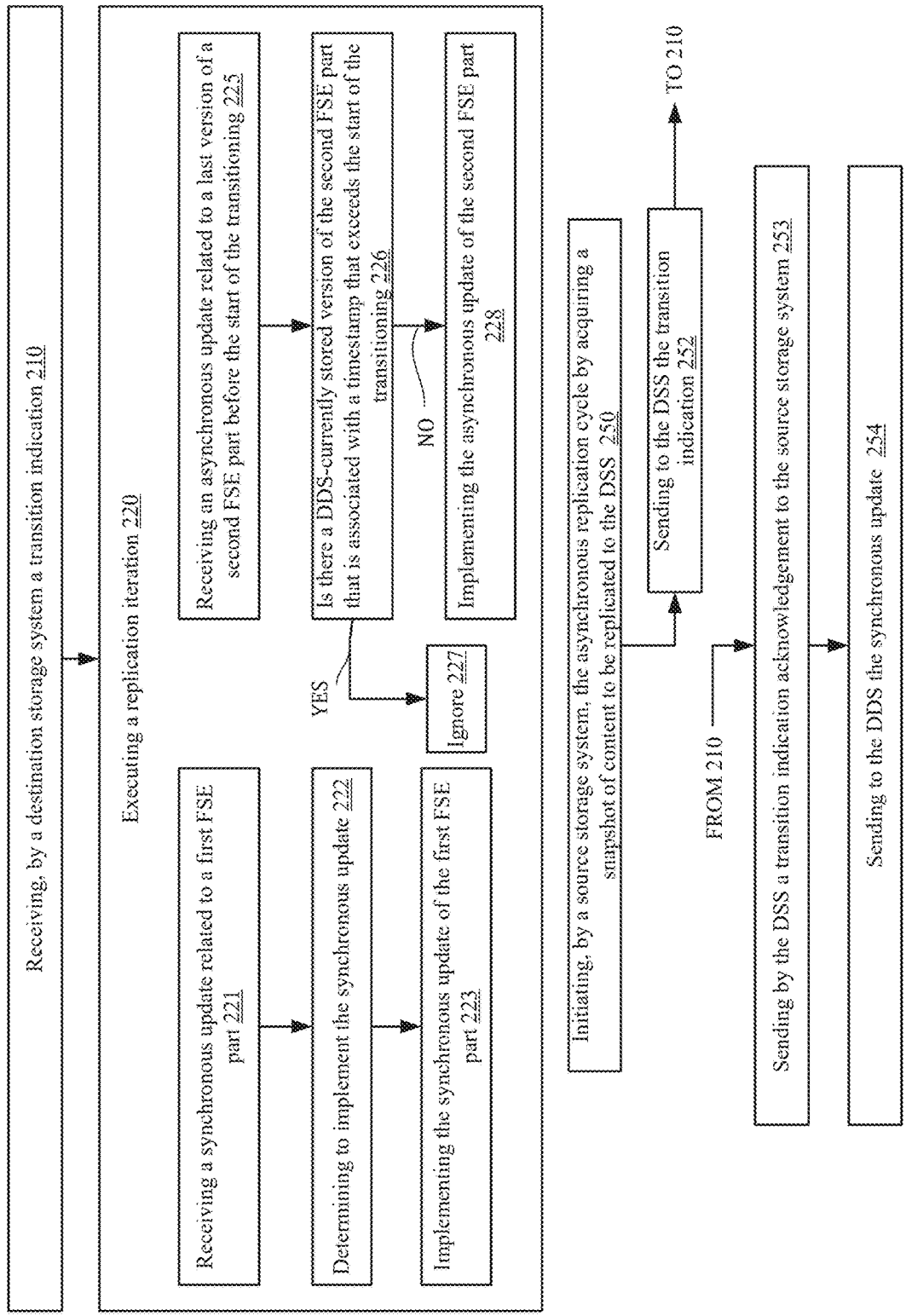
FIG. 2 is an example of a method.

FIG. 2 illustrates an example of method 200 for transitioning from asynchronous replication to a synchronous replication.

According to an embodiment, method 200 includes step 210 of receiving, by a destination storage system (DSS) a transition indication regarding a start of the transitioning. An example of the indication is message 112 of FIG. 1.

According to an embodiment, step 210 is followed by step 220 of executing a replication iteration during which updates are received by the DSS and the DSS determines how to respond to the updated.

According to an embodiment, during step 220 the DSS received one or more synchronous updates and one or more asynchronous updates. The synchronous and asynchronous updates may be received in order or out of order.

According to an embodiment, during the replication iteration, the synchronous updates are associated with points of time that follow the start of the transitioning and the asynchronous updates are associated with points of time that precede the start of the transitioning. The asynchronous updates are actually associated with points of time that precede the time of starting of the present asynchronous replication cycle, e.g., time t1 of FIG. 1, when the source storage system sent message 111, that immediately precedes message 112 about the start of the transitioning at t1'. The time gap between t1 and t1' may be negligible (e.g., less than 10 microseconds). If any new updates are received by the source storage system from connected users, between the start of the present asynchronous replication cycle and the start of the transitioning, then the source storage system may withhold the execution of these updates until the start of transitioning is acknowledged by the destination storage system, and then these updates will be performed as part of the synchronous replication.

According to an embodiment, an asynchronous update related to a FSE part is a last version of the FSE part before the start of the transitioning. For example, if the FSE part was updated multiple times between a previous asynchronous replication cycle and the start of the present asynchronous replication cycle (which occurred slightly before the start of the transitioning), only the last update that took place (and overwrote previous content)—will be replicated as part of the present asynchronous replication cycle.

According to an embodiment, step 220 includes receiving and managing synchronous updates and receiving and managing asynchronous updates.

According to an embodiment, the receiving and managing synchronous updates are executed during an asynchronous replication cycle.

According to an embodiment, the receiving and managing asynchronous updates are executed during an asynchronous replication cycle.

According to an embodiment, the synchronous replication and the asynchronous updates are at least partially overlapping. Once all the updates that occurred before the start of the transition are implemented as part of the asynchronous replication cycle—the synchronous replication continues, and the asynchronous replication ends.

According to an embodiment, step 220 includes steps 221 and 222.

According to an embodiment, step 221 includes receiving, by the DSS and following the start of the transitioning, a synchronous update related to a first file system entity (FSE) part. The FSE part may be an address range within a file, update of file attributes, update of files with a directory, etc.

According to an embodiment, step 221 is followed by step 222 of determining to implement the synchronous update.

According to an embodiment, step 222 is followed by step 223 of implementing the synchronous update of the first FSE part. The implementing may include performing the update on the first FSE part, without considering stored versions that were written as part of any asynchronous replication cycle.

According to an embodiment, step 222 is executed without checking whether the DSS currently stores another version of the first FSE part.

According to an embodiment, step 222 is executed without checking a value of a timestamp associated with a DSS currently stored version of the first SE part.

According to an embodiment, step 221 is always followed by step 223.

According to an embodiment, step 223 includes storing the first FSE part in the DSS and sending an acknowledgement message to a source storage system that is in a replication relationship with the DSS.

According to an embodiment, step 220 includes steps 225, 226, 227 and 228.

According to an embodiment, step 225 includes receiving, by the DSS and following the start of the transitioning, an asynchronous update related to a last version of a second FSE part before the start of the transitioning. The asynchronous update may not include information about the identity or the timing of the last version, and the DSS may determine that the asynchronous update is related to a version before the start of the transitioning. The second FSE part may be the same part as the first FSE part, or a different part of the same FSE or a different FSE.

According to an embodiment, step 225 is followed by step 226 of checking (i) whether the DDS currently stores a version of the second FSE part, and (ii) whether the DDS currently stores a version of the second FSE part that is associated with a timestamp that exceeds the start of the transitioning.

When conditions (i) and (ii)—are fulfilled—step 226 is followed by step 227 of ignoring the asynchronous update.

Else (there is no stored version or there is a stored version that precedes the start of the transitioning)—step 226 is followed by step 228 of implementing the asynchronous update.

While steps 210 and 220 are executed by the DSS, the source storage system may execute one or more steps during the replication cycle. For simplicity of explanation, these steps are illustrated as being included in method 200—but each one of the storage systems may operate independently from the other.

According to an embodiment, step 200 includes step 250 of initiating, by a source storage system, the asynchronous replication cycle by acquiring a snapshot of content to be replicated to the DSS.

According to an embodiment, step 250 is followed by step 252 of sending to the DSS the transition indication.

According to an embodiment, step 252 is followed by step 210.

According to an embodiment, step 210 is also followed by step 253 of sending by the DSS a transition indication acknowledgement to the source storage system following the reception of the transition indication.

According to an embodiment, step 253 is followed by step 254 of sending to the DDS the synchronous update following a reception of the transition indication acknowledgement by the source storage system.

Method 200 provides an improvement in computer science as it saves memory and computational resources—especially as the response to a synchronous update that does not require to read timestamps and/or to send timestamps associated with the updates, or to check timestamps associated with received updates, or to check the presence of a currently stored version of an FSP part in the DSS. Furthermore—even the management of the asynchronous update request is very simple and includes comparing a timestamp of a currently stored version FSE part in the DSS to the start of the transitioning.

The simplicity of method 200 also stems from the fact that the order in which the update requests are received—does not matter—and there is no need to perform costly out of order arrangement measures. Method 200 further provides an improvement of a transitioning from asynchronous replication mode to synchronous replication mode, where the synchronous replication starts immediately when required, and without needing to wait for the asynchronous replication to complete before starting the synchronous replication mode, but rather performing updates using both modes until completing asynchronous replication of older updates.

Figure 3:
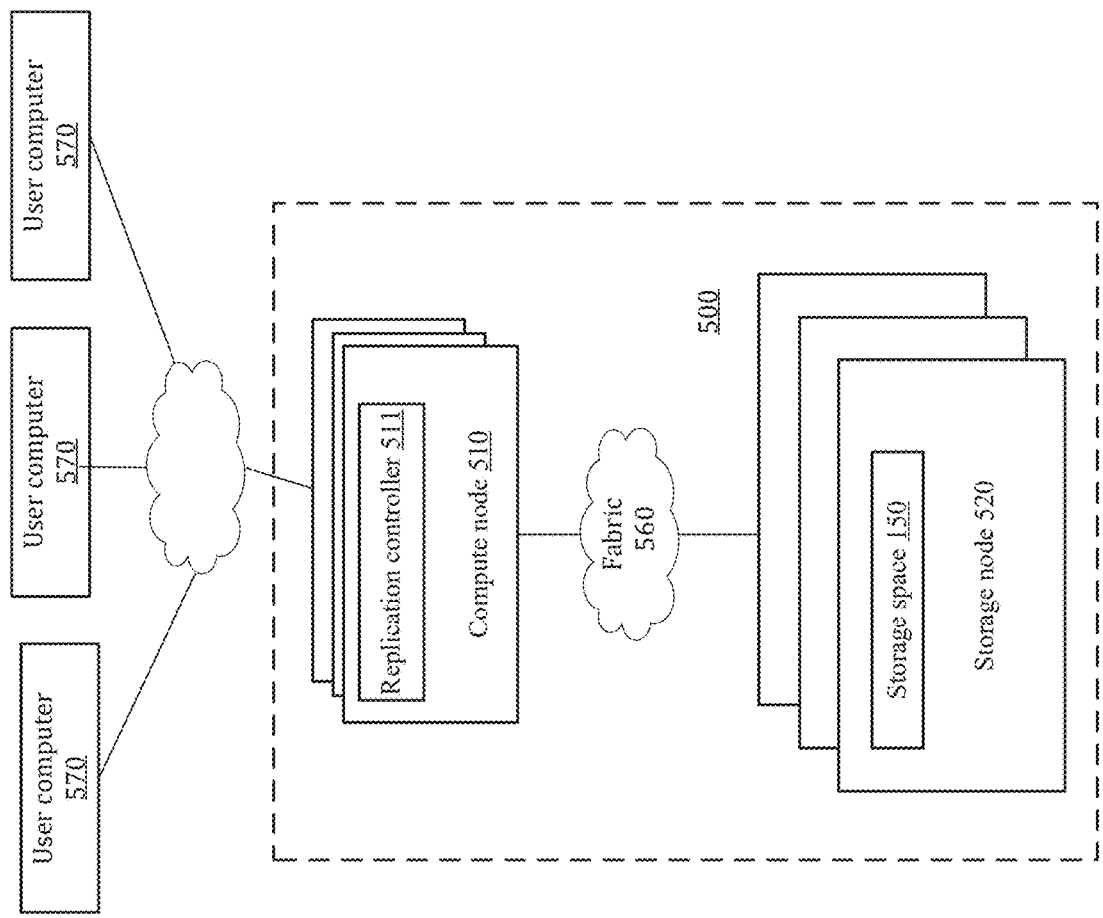
FIG. 3 is an example of a storage system.

FIG. 3 illustrates an example of a storage system 500, which may act as either a source storage system or a destination storage system. The storage system 500 includes one or more compute nodes 510. One or more compute nodes 510 include a replication controller 511 that is configured to execute method 200 and/or to control one or more replication iterations. The replication controller is a hardware controller that can include a processing circuitry, integrated circuitry, a part of processing circuitry, and the like. The processing/integrated circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

The storage system 500 also includes one or more storage nodes 520, wherein each storage node includes storage devices for storing data, The storage devices may be Solid State Drives (SSDs), NVRAM (non-volatile random-access memory) devices, etc. The storage devices and particularly the NVRAM, may compose or include storage space 150.

The computer nodes 510 and the storage nodes 520 are connected through a communication fabric 560 for accessing stored data.

The compute nodes are connected to one or more user computers 570 that may access the source storage system and send write requests that include data portions or metadata changes, related to a FSE part (e.g., file content or metadata, directory content or metadata, etc.) to be safely stored. Updates imposed by the write requests are implemented in the source storage system and sent to the destination storage system, using either a synchronous replication or an asynchronous replication.

Each of the compute entities includes at least one processing circuitry that may include a central processing unit (CPU), and/or one or more other integrated circuits such as application-specific integrated circuits (ASICs), field programmable gate arrays (FPGAs), full-custom integrated circuits, etc., or a combination of such integrated circuits.

Any reference to "may be" should also refer to "may not be".

In the foregoing detailed description, numerous specific details are set forth in order to provide a thorough understanding of the one or more embodiments of the disclosure. However, it will be understood by those skilled in the art that the present one or more embodiments of the disclosure may be practiced without these specific details. In other instances, well-known methods, procedures, and components have not been described in detail so as not to obscure the present one or more embodiments of the disclosure.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may for the most part, be implemented using electronic components and circuits known to those skilled in the art, details will not be explained in any greater extent than that considered necessary as illustrated above, for the understanding and appreciation of the underlying concepts of the present one or more embodiments of the disclosure and in order not to obfuscate or distract from the teachings of the present one or more embodiments of the disclosure.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system and any other component should be applied mutatis mutandis to a method that may be executed by a system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Any combination of any module or unit listed in any of the figures, any part of the specification and/or any claims may be provided. Especially any combination of any claimed feature may be provided.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

We claim:

1. A method for transitioning from asynchronous replication to a synchronous replication, the method comprises:
   (a) receiving, by a destination storage system (DSS) a transition indication regarding a start of the transitioning;
   (b) receiving, by the DSS and following the start of the transitioning, a synchronous update related to a first file system entity (FSE) part;
   (c) implementing the synchronous update of the first FSE part;
   (d) receiving, by the DSS and following the start of the transitioning, an asynchronous update related to a last version of a second FSE part before the start of the transitioning;
   (e) ignoring the asynchronous update in response to the DSS currently storing a version of the second FSE part that is associated with a timestamp that is indicative of a point in time that exceeds the start of the transitioning; and
   (f) implementing the asynchronous update in response to the DSS not currently storing any version of the second FSE part, or in response to the DSS currently storing a version of the second FSE part that is associated with a timestamp that is indicative of a point in time that precedes the start of the transitioning.

2. The method according to claim 1 comprising determining to implement the synchronous update without checking whether the DSS currently stores another version of the first FSE part.

3. The method according to claim 1, comprising determining to implement the synchronous update without checking a value of a timestamp associated with a DSS currently stored version of the first FSE part.

4. The method according to claim 1, wherein the implementing of the synchronous update of the first FSE part comprising storing the first FSE part in the DSS and sending an acknowledgement message to a source storage system that is in a replication relationship with the DSS.

5. The method according to claim 1, wherein steps (a)-(f) are executed during a replication iteration.

6. The method according to claim 5 wherein the replication iteration comprises an asynchronous replication cycle.

7. The method according to claim 6, comprising initiating, by a source storage system, the asynchronous replication cycle by acquiring a snapshot of content to be replicated to the DSS, wherein the source storage system is in a replication relationship with the DSS.

8. The method according to claim 7, comprising sending, by the DSS, a transition indication acknowledgement to the source storage system following the reception of the transition indication.

9. The method according to claim 8, comprising receiving, by the DSS, the synchronous update following a reception of the transition indication acknowledgement by the source storage system.

10. At least one non-transitory computer readable medium for transitioning from asynchronous replication to a synchronous replication, the at least one non-transitory computer readable medium comprises:
    (a) receiving, by a destination storage system (DSS) a transition indication regarding a start of the transitioning;
    (b) receiving, by the DSS and following the start of the transitioning, a synchronous update related to a first file system entity (FSE) part;
    (c) implementing the synchronous update of the first FSE part;
    (d) receiving, by the DSS and following the start of the transitioning, an asynchronous update related to a last version of a second FSE part before the start of the transitioning;
    (e) ignoring the asynchronous update in response to the DSS currently storing a version of the second FSE part that is associated with a timestamp that is indicative of a point in time that exceeds the start of the transitioning; and
    (f) implementing the asynchronous update in response to the DSS not currently storing any version of the second FSE part, or in response to the DSS currently storing a version of the second FSE part that is associated with a timestamp that is indicative of a point in time that precedes the start of the transitioning.

11. The at least one non-transitory computer readable medium according to claim 10, that further stores instructions for determining to implement the synchronous update without checking whether the DSS currently stores another version of the first FSE part.

12. The at least one non-transitory computer readable medium according to claim 10, that further stores instructions for determining to implement the synchronous update without checking a value of a timestamp associated with a DSS currently stored version of the first FSE part.

13. The at least one non-transitory computer readable medium according to claim 10, wherein the implementing of the synchronous update of the first FSE part comprising storing the first FSE part in the DSS and sending an acknowledgement message to a source storage system that is in a replication relationship with the DSS.

14. The method according to claim 1, wherein steps (a)-(f) are executed during a replication iteration.

15. The method according to claim 5 wherein the replication iteration comprises an asynchronous replication cycle.

16. The at least one non-transitory computer readable medium according to claim 15, that further stores instructions for initiating, by a source storage system, the asynchronous replication cycle by acquiring a snapshot of content to be replicated to the DSS, wherein the source storage system is in a replication relationship with the DSS.

17. The at least one non-transitory computer readable medium according to claim 16, that further stores instructions for sending, by the DSS, a transition indication acknowledgement to the source storage system following the reception of the transition indication.

18. The at least one non-transitory computer readable medium according to claim 17, that further stores instructions for receiving, by the DSS, the synchronous update following a reception of the transition indication acknowledgement by the source storage system.

19. A destination storage system that is configured to transition from asynchronous replication to a synchronous replication, the destination storage system comprises:
    a replication controller that is a hardware controller that comprises a processing circuitry;
    a storage node;
    wherein the replication controller is configured to:
    (a) receive a transition indication regarding a start of the transitioning;
    (b) receive, following the start of the transitioning, a synchronous update related to a first file system entity (FSE) part;

(c) implement the synchronous update of the first FSE part;
(d) receive, following the start of the transitioning, an asynchronous update related to a last version of a second FSE part before the start of the transitioning;
(e) ignore the asynchronous update in response to the storage node currently storing a version of the second FSE part that is associated with a timestamp that is indicative of a point in time that exceeds the start of the transitioning; and
(f) implement the asynchronous update in response to the storage node not currently storing any version of the second FSE part, or in response to the storage node currently storing a version of the second FSE part that is associated with a timestamp that is indicative of a point in time that precedes the start of the transitioning.

* * * * *